Jan. 29, 1924.  
H. TRUST ET AL  
1,482,279  
MIXING AND BEATING MACHINE  
Filed Dec. 10, 1919
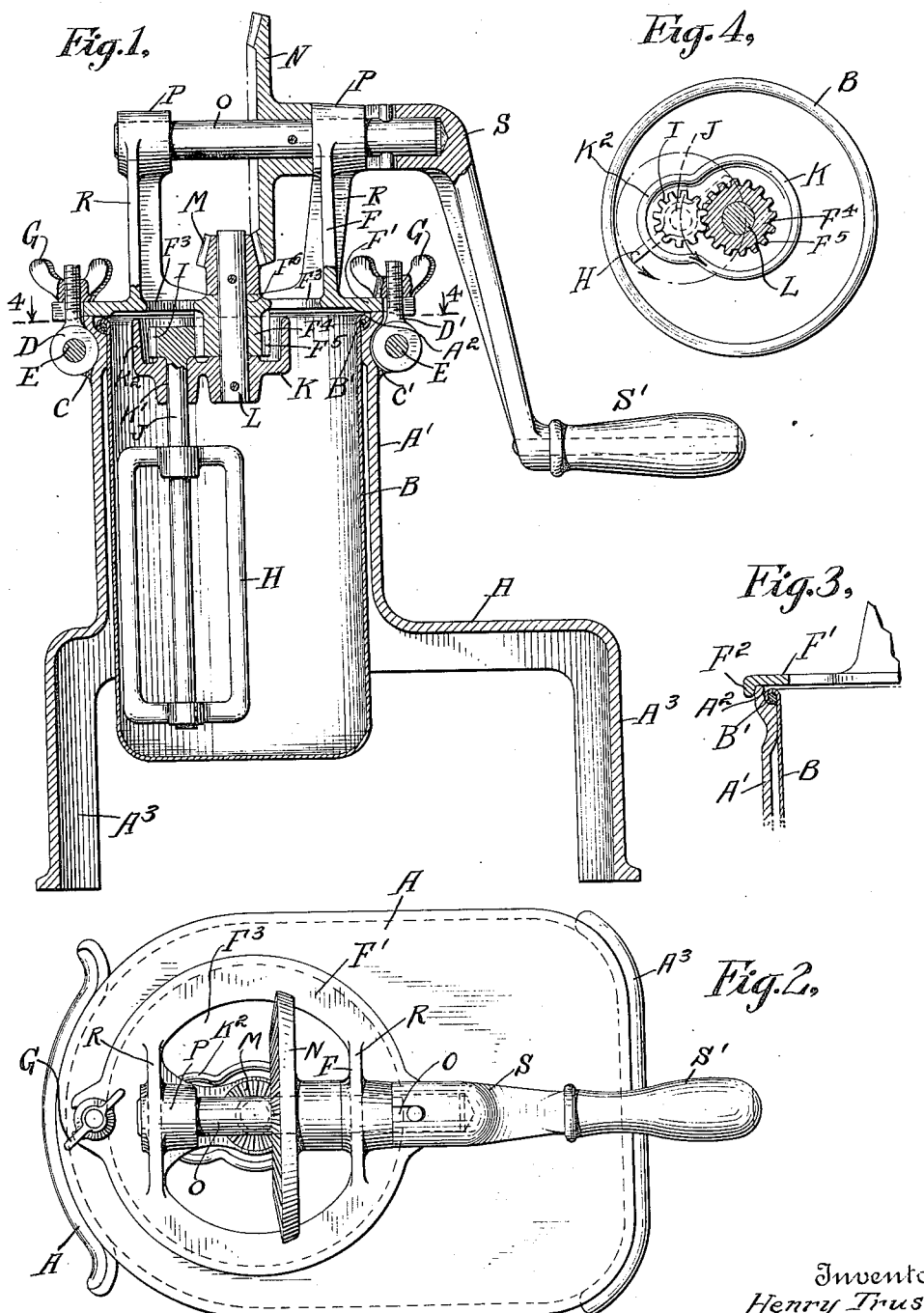
Inventor  
Henry Trust  
and  
By their Attorney Frank M. Ashley  
Frank M Ashley Patented Jan. 29, 1924.

1,482,279

UNITED STATES PATENT OFFICE.

HENRY TRUST, OF PARK RIDGE, NEW JERSEY, AND FRANK M. ASHLEY, OF BROOKLYN, NEW YORK; SAID ASHLEY ASSIGNOR OF HIS RIGHT TO JOSEPHINE TRUST, OF PARK RIDGE, NEW JERSEY; JOSEPHINE TRUST ADMINISTRATRIX OF SAID HENRY TRUST, DECEASED.

MIXING AND BEATING MACHINE.

Application filed December 10, 1919. Serial No. 343,967.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Mixing and Beating Machines, of which the following is a specification.

Our invention relates to mixing and beating machines and the object of our invention is to provide a machine comprising a base adapted to hold receptacles of different lengths and the top of which is adapted to support and hold mechanical parts used in preparing food in restaurants and for private family use. A further object is to provide a strong and compact machine of simple construction and low cost that can be operated manually for use in making mayonnaise, vegetable and meat dressings, etc.

Referring to the drawings which form a part of this specification:

Figure 1. is a vertical sectional view of a machine embodying our invention.

Figure 2. is a plan view thereof.

Figure 3. is a fragmental view illustrating an outer depending flange on the base plate of the bracket.

Figure 4. is an illustrational plan view of a section of the receptacle and the beater.

A indicates the base of the machine provided with a cylindrical upper part A' having an annular groove A² in which is seated below the top thereof the beaded edge B' of the receptacle B. The base A is provided with an extending portion A³ and is open on the sides to permit a pan to slide under to receive the finished product. The extension A³ makes the machine more stable when the machine is being operated and also permits a pan of larger diameter being placed under the base than could otherwise be used. C and C' illustrate the lugs cast integral with the cylinder portion A' and D and D' are short bolts hinged thereto and mounted on cross bars E—E respectively. F indicates a frame, the base plate F' of which is held in position on the cylinder A' by the wing nuts G—G respectively. It is important that the base plate is accurately positioned on the cylinder A' to insure the beater H being accurately positioned in the receptacle B and therefore a depending flange F² is provided for this purpose. The base plate F' is provided with openings F³—F³ through which the food ingredients may be introduced to the receptacle B and also inspected during the operation of mixing or whipping. Cast integral with the base plate F' is a depending hub F⁴ having a toothed gear F⁵ cast integral therewith which meshes with a gear wheel I carried on the upper end of a spindle J to which is fastened the beater H. K indicates a casing having a bearing K' for the spindle J and an upwardly extending wall K²₁ to serve as a housing for the gears F⁵ and I. The hub F⁴ is provided with a bearing F⁶ in which is fitted a short shaft L through which the casing K is rotated and on the upper end of said shaft a gear wheel M is mounted which is driven by the gear wheel N. The gear wheel N is mounted on the cross shaft O which is mounted in bearings P—P formed in the upper end of the brackets R—R. A crank S having a handle S' is fitted to the shaft O to drive the same. The relative size of the gears is such that the beater rotates about six times to one of the shaft O. When the frame F is removed from the cylinder A' all the working parts being connected therewith, are kept together and there are no loose or separate parts liable to be lost.

In operation, the turning of the crank S drives the gear wheels N, M and shaft L, thus rotating the casing K carrying the gear wheel I which is rotated by reason of its meshing with the fixed gear F⁵, thus imparting both a rotational and revolving movement to the beater H. The beater H is preferably of a width greater than one-half of the diameter of receptacle B so that its blades sweep across the vertical centre of the receptacle and thus thoroughly agitates the food materials treated.

Having thus described our invention, we claim as new and desire to secure by Letters Patent:

1. A machine comprising a base portion, a receptacle supported thereby, a frame mounted on said base portion, adapted to clamp said receptacle to said base portion and having a depending hub with gear teeth cast integral therewith, a casing, a spindle carried by said casing, a gear wheel connected to said spindle and meshing with said gear teeth on the hub and means by which said casing may be rotated.

2. A machine comprising a base portion, a receptacle supported thereby, a frame mounted on said base portion, adapted to clamp said receptacle to said base portion and having a depending hub with gear teeth cast integral therewith, and having brackets thereon comprising bearings, a shaft supported in said bearings, a casing, a spindle carried by said casing, a gear wheel connected to said spindle and meshing with said gear teeth on the hub and means for transmitting motion through said shaft to rotate said spindle.

3. A machine comprising a base portion, a receptacle supported thereby, a frame mounted on said base portion, adapted to clamp said receptacle to said base portion and having a depending hub with gear teeth cast integral therewith and having brackets thereon comprising bearings, a shaft supported in said bearings, a casing, a spindle carried by said casing, a gear wheel connected to said spindle and meshing with said gear teeth on the hub, a beater carried by said spindle, and means for transmitting motion through said shaft to rotate said spindle.

4. A machine comprising a base portion having an annular groove in its top, a receptacle having a beaded top edge resting in said groove, a frame mounted above said receptacle, means for securing said frame to the top of said base portion, said frame having an opening in its base communicating with said receptacle and having a depending hub, gear teeth on said hub, a casing, a spindle carried thereby, a gear wheel on said spindle meshing with said teeth on said hub and means carried by said frame for transmitting motion to said casing.

5. A machine comprising a base portion having an annular groove in its top and an opening in its base, a receptacle having a beaded top edge resting in said groove, a frame mounted above said receptacle, means for securing said frame to the top of said base portion, said frame having an opening in its base communicating with said receptacle and having a depending hub, gear teeth on said hub, a casing, a spindle carried thereby, a gear wheel on said spindle meshing with said teeth on said hub and means carried by said frame for transmitting motion to said casing.

6. A machine comprising a base portion having an annular groove in its top, a receptacle having a beaded top edge resting in said groove, a frame mounted on said body portion above said receptacle and having openings in its base portion communicating with said receptacle, and having a gear wheel formed integral with said frame and dependent therefrom, a beater the width of which is greater than one half the diameter of said receptacle, and means, comprising a gear wheel in mesh with the gear on said frame, for transmitting motion to said beater.

7. A machine comprising a base portion having an annular groove in its top, a receptacle having a beaded top edge resting in said groove, a frame mounted on said body portion above said receptacle and having openings in its base portion communicating with said receptacle, and having a gear wheel formed integral with said frame and dependent therefrom, a beater the width of which is greater than one half the diameter of said receptacle, and means, comprising a gear wheel in mesh with the gear on said frame, for transmitting motion to said beater, and means, comprising wing nuts and hinged bolts, for holding said frame to said base portion.

8. A machine comprising a base portion, a receptacle removably supported in said base portion, a frame mounted above said receptacle, means for securing said frame to the top of said base portion, which serve also to clamp the said receptacle in position therein, said frame having a depending hub, gear teeth on said hub, a casing, a spindle carried thereby, a gear wheel on said spindle meshing with said teeth on said hub and means carried by said frame for rotating said casing, said frame, casing and gears being bodily removable as a unit from said body portion.

9. A machine comprising a base portion, a receptacle removably supported in said base portion, a frame mounted above said receptacle, means for securing said frame to the top of said body portion, said means comprising bolts hinged to said body portion and nuts engaging said bolts adapted to clamp the frame in position, which serve also to clamp the said receptacle in position therein, said frame having a depending hub, gear teeth on said hub, a casing, a spindle carried thereby, a gear wheel on said spindle meshing with said teeth on said hub and means carried by said frame for rotating said casing, said frame, casing and gears being bodily removable as a unit from said body portion.

Signed at New York city, in the county of New York and State of New York, this 3rd day of December, A. D. 1919.

HENRY TRUST.
FRANK M. ASHLEY.